US005632670A

United States Patent [19]
Gwyther

[11] Patent Number: 5,632,670
[45] Date of Patent: May 27, 1997

[54] VACUUM STEAM WAND FOR SANITIZING A CARCASS

[75] Inventor: Peter Gwyther, Madison, Conn.

[73] Assignee: Jarvis Products Corporation, Middletown, Conn.

[21] Appl. No.: 548,594

[22] Filed: Oct. 26, 1995

[51] Int. Cl.$^6$ ............................................. A22B 5/08
[52] U.S. Cl. ............................ 452/74; 452/173; 15/321
[58] Field of Search .................... 452/105, 74, 77, 452/102, 81, 173; 15/321, 322, 344, 345, 353, 420, 246

[56] References Cited

U.S. PATENT DOCUMENTS

| Re. 26,950 | 9/1970 | Hays | 15/321 |
|---|---|---|---|
| 1,254,248 | 1/1918 | Lowry . | |
| 2,916,761 | 12/1959 | Oberg | 15/322 |
| 3,186,132 | 6/1965 | Duncan et al. | 15/11 |
| 3,436,787 | 4/1969 | Wisdom | 15/321 |
| 3,439,374 | 4/1969 | Wisdom | 15/321 |
| 3,667,086 | 6/1972 | Sexton | 17/66 |
| 3,883,301 | 5/1975 | Emrick et al. | 15/321 |
| 4,074,387 | 2/1978 | Arato et al. | 15/322 |
| 4,258,452 | 3/1981 | Adcock et al. | 17/51 |
| 4,446,593 | 5/1984 | Bell et al. | 15/322 |
| 4,649,594 | 3/1987 | Grave | 15/322 |
| 4,875,249 | 10/1989 | Collier | 15/398 |
| 4,949,424 | 8/1990 | Sheko | 15/321 |
| 5,503,594 | 4/1996 | Karubian et al. | 452/173 |

*Primary Examiner*—Willis Little
*Attorney, Agent, or Firm*—DeLio & Peterson, LLC

[57] ABSTRACT

A vacuum steam wand for sanitizing a carcass includes a housing having a handle and a thermally conductive vacuum head with steam passages within that maintain the temperature of the vacuum head above a desired sanitizing temperature. The vacuum head includes a wall defining a vacuum region that is surrounded at the interior and exterior perimeter by multiple closely spaced steam nozzles that continuously wash the wall, spray the carcass to loosen contaminants and maintain the temperature of the wall at or above the sanitizing temperature. Only steam is used and water is not needed by the tool. A thermometer for monitoring temperature is provided and portions of the tool are coated with a nonstick coating to prevent contaminants from adhering due to the high temperature of the tool surface and to reduce friction with the carcass. The wall has a lowered height portion which improves the vacuum lifting action and allows the inner wall surface to act as a scraper to prevent contaminants from collecting on the outer wall surface.

51 Claims, 4 Drawing Sheets

VACUUM STEAM WAND FOR SANITIZING A CARCASS

BACKGROUND OF THE INVENTION

1. Field of the Invention

This invention relates to devices for removing contaminants from the surface of a carcass during meat processing. More particularly, this invention relates to tools that use vacuum and steam for removing such contaminants and for sanitizing the carcass.

2. Description of Related Art

During the initial processing of a carcass, contaminants can be inadvertently spread to the surface of the carcass. Such contaminants may be dirt or soil, residue from previous carcass processing steps or they may include fecal matter or other types of bacteriologically active contaminants. Before further processing, these contaminants must be removed to maintain the cleanliness of the carcass and the subsequent processing. A conventional method of removal is to excise the contaminated area from the carcass by cutting out the area with a knife.

This excision procedure is wasteful of the meat in the carcass, but more importantly, the knife used to make the removal cut can become contaminated and spread the contamination from the carcass surface deep into the meat of the carcass.

An alternative method to the excision method described above uses a tool, referred to as a "wand", that employs vacuum in combination with high temperature water and steam to loosen the contaminant from the carcass surface and suction it away for disposal. For such a system to be acceptable, the tool needs to remove the contaminant while simultaneously producing a sanitary surface on the carcass and avoiding the spread of the contaminant to other locations on the carcass. Unfortunately, current systems have been relatively unsuccessful at meeting these basic requirements.

A first problem has been with maintaining the proper sanitizing temperature of the water and steam. The vacuum system continuously draws air into the tool in the region being cleaned, and this air acts to rapidly cool the carcass surface and the hot water or hot water/steam being emitted by nozzles in the vicinity being cleaned. The placement of nozzles in prior art tools has been too far from the carcass surface to maintain the sanitizing temperature and properly sanitize the surface of the carcass.

In a tool of this type which uses a heated working fluid, such as water or steam, it is necessary to project the heated fluid against the carcass surface as the head passes over the location of the contamination. This loosens the contaminant and sanitizes the surface as it is removed by the airflow produced by the vacuum under the tool head.

At the exterior perimeter region of such tools, the heated fluid used may be pure steam. In this exterior region, the steam flow from the nozzles is in the same general direction as the flow of air. However, in the interior region and directly underneath the tool head where the bulk of the contaminant is likely to be found, the working fluid nozzles must project the heated fluid in the opposite general direction to the flow of air being drawn into the tool. The design of prior art tools, including the shape of the head and the relative positioning of the nozzles is such that they must use a relatively dense heated working fluid (with substantial weight and momentum) in the interior region in order for the heated fluid to arrive at the surface with an adequate temperature.

Accordingly, heated water or water/steam combinations, not steam alone, has been used as the working fluid in this interior region. Nonetheless, heated water is severely cooled by the reverse airflow as it transits from the inner nozzles to the surface, and many difficulties are encountered with maintaining the proper sanitizing temperatures.

The use of hot water in the interior region also has other disadvantages, as compared to steam. One is that water must be supplied to the tool, in addition to steam and vacuum. Another is that the water often is not completely removed from the surface of the carcass by the vacuum. This residue of water can quickly spread the contamination over a much larger region than was originally contaminated.

A further problem is that water cannot be heated above the boiling point, which may be only slightly above the desired sanitizing temperature, leaving very little range between the starting temperature of the water and the minimum temperature that must be maintained. A higher water flow through the nozzles may decrease the cooling effect somewhat and produce a higher temperature at the surface of the carcass, but this would seriously increase the water spread contamination problem. Combination steam and hot water nozzle systems have been only partially successful for the same reasons.

Aside from difficulties in maintaining the sanitizing temperature, previous vacuum-based systems have had problems with cleanliness resulting in the spread of contamination by the working head of the tool. During use, the tool head comes into contact with the contaminants. Unless the head is cleaned repeatedly, this can further spread the contamination. In view of the difficulties described above, vacuum based carcass cleaning systems have not been widely accepted.

Bearing in mind the problems and deficiencies of the prior art, it is therefore an object of the present invention to provide a vacuum steam wand for sanitizing a carcass which uses steam and does not use hot water to avoid a contamination through the spread of water.

It is another object of the present invention to provide a vacuum steam wand for sanitizing a carcass which is self-sanitizing and continuously maintains the working end of the tool at a temperature above the desired sanitizing temperature.

It is a further object of the present invention to provide a vacuum steam wand for sanitizing a carcass which continuously washes the sides and edges of the tool at the working end with steam to remove contaminants from the tool surface, particularly in the sides and corners to avoid the spread of contamination.

A further object of the present invention is to provide a means of preventing contaminants from adhering to the tool surface and to permit easy cleaning thereof.

It is yet another object of the present invention to provides a comfortably insulated handle.

A further object of the present invention is to provide a means of monitoring the steam temperature.

Still other objects and advantages of the invention will in part be obvious and will in part be apparent from the specification.

SUMMARY OF THE INVENTION

The above and other objects, which will be apparent to those skilled in the art, are achieved in the present invention which is directed to a vacuum steam wand for sanitizing a carcass including a housing having a handle and a thermally conductive vacuum head with steam passages within that maintain the temperature of the vacuum head above a desired sanitizing temperature. The vacuum head portion of the housing includes a wall defining a vacuum region, the wall having an inner wall surface, an outer wall surface and a lip for contacting the carcass during vacuum steam sanitizing.

A vacuum passage within the housing is connected to the vacuum region and to a vacuum port adapted for connection to a source of vacuum. A steam passage is located within the housing, capable of maintaining and supplying steam at or above a desired sanitizing temperature. The steam passage is connected to a plurality of inner steam nozzles, a plurality of outer steam nozzles and to a steam inlet port adapted for connection to a source of steam. At least a portion of the steam passage is located adjacent to and in thermal contact with the wall to hold it at a temperature at or above the sanitizing temperature.

The inner steam nozzles are located within the vacuum region adjacent to the inner wall surface and the outer steam nozzles are located adjacent to the outer wall surface. The number and location of the inner and outer steam nozzles is sufficient, in combination with the steam passage in thermal contact with the wall, to maintain the wall at or above the desired sanitizing temperature when the wand is in use. Preferably, most of the vacuum head portion is also at or above the desired sanitizing temperature.

To prevent contaminants from cooking onto the vacuum head due to the relatively high temperature, it is preferably coated partially or completely with a nonstick coating. This also reduces friction between the tool and the carcass. The multiple closely spaced steam nozzles continuously wash the wall, spray the carcass to loosen contaminants and maintain the temperature of the wall at or above the sanitizing temperature. Only steam is used and water is not needed. A thermometer for monitoring temperature is also provided.

A section of the wall has a lower height than remaining sections of the wall, the lower height section acting to allow contaminants on the carcass to pass into the vacuum region without accumulating on the outer wall surface as the wand is drawn over the carcass during use. The remaining sections of the wall act to scrape contaminants from the carcass with their inner wall surfaces where they may be dislodged by steam emitted by the nearby nozzles and drawn away by vacuum.

The steam passage extends beneath the wall to form a ring shaped steam chamber and has a width that is greater than the width of the wall above the steam passage. This allows the inner and outer steam nozzles to be formed simply by drilling them vertically down into the steam chamber.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
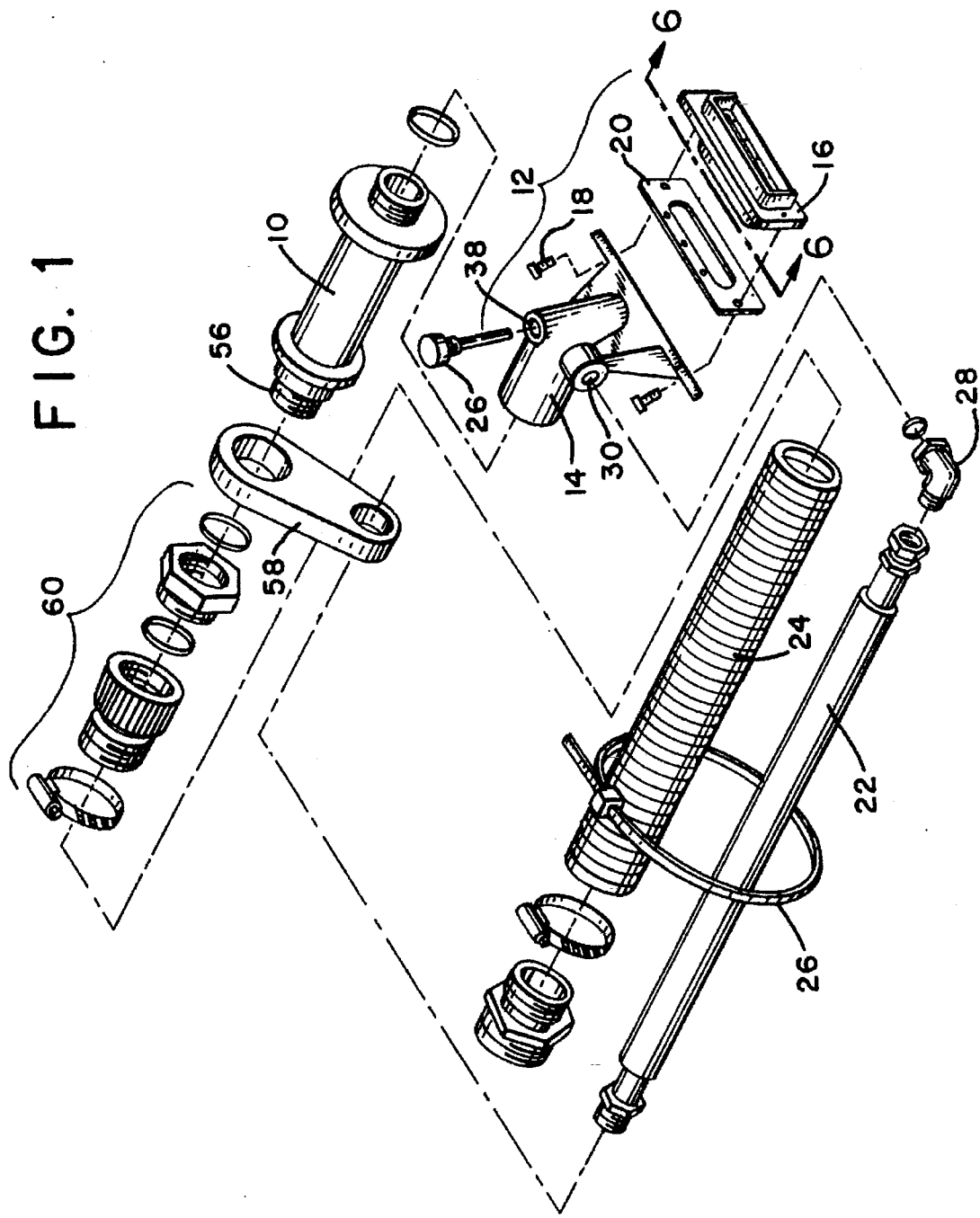
FIG. 1 is an exploded view of the tool according to the present invention.
Figure 2:
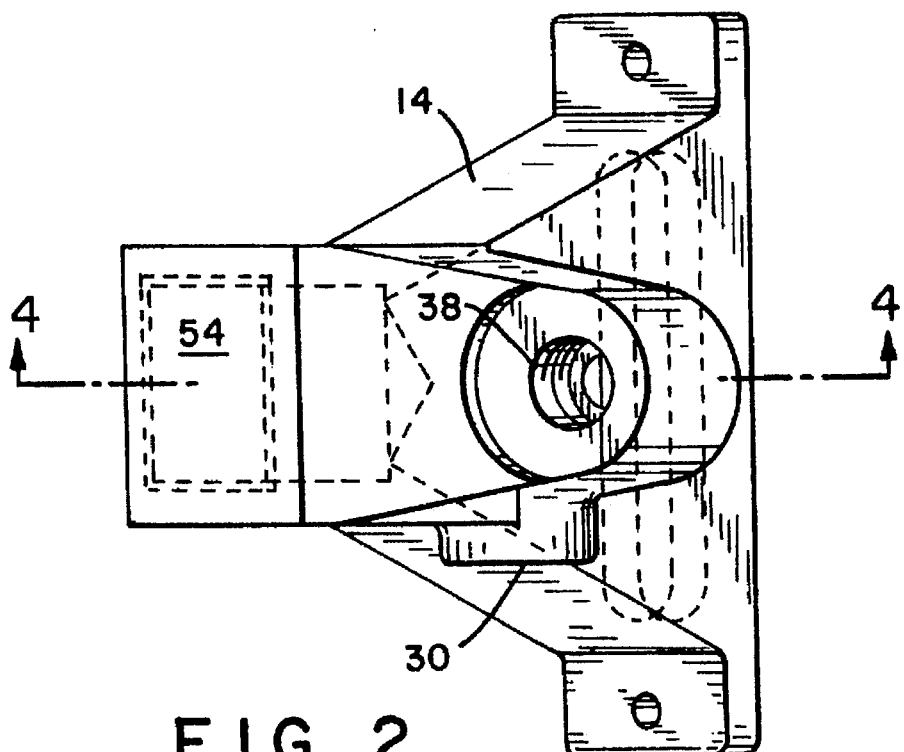
FIG. 2 is a top plan view of a first section of the vacuum head portion of the housing.
Figure 3:
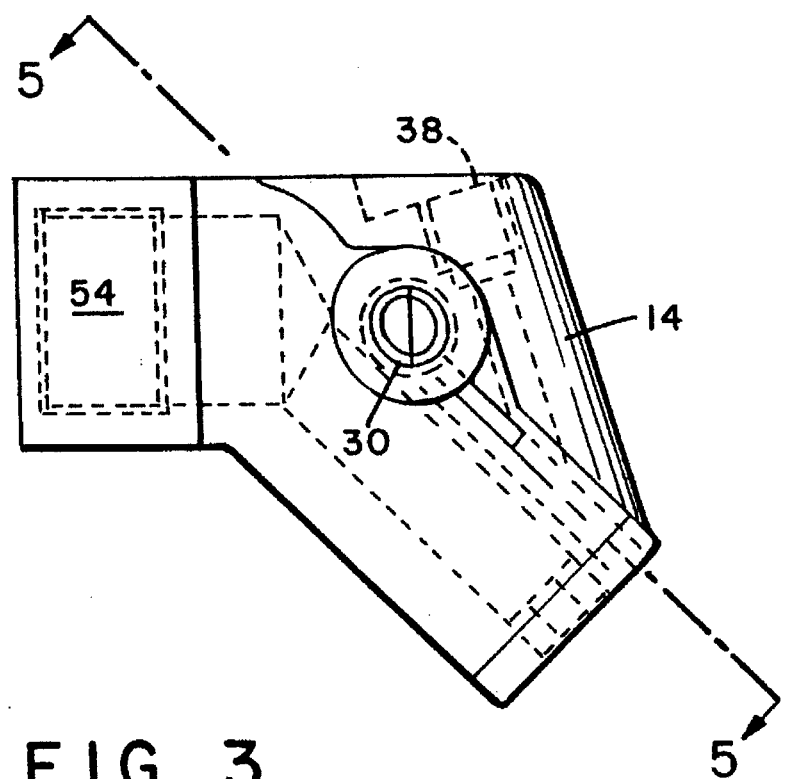
FIG. 3 is a side elevational view of the first section of the vacuum head portion of the housing.

In describing the preferred embodiment of the present invention, reference will be made herein to FIGS. 1–7 of the drawings in which like numerals refer to like features of the invention. Features of the invention are not necessarily shown to scale in the drawings.

FIG. 1 provides an exploded perspective view of the vacuum steam wand for sanitizing a carcass in accordance with the present invention. The wand includes a housing comprising a handle portion 10 connected to a vacuum head portion generally indicated by reference numeral 12. The vacuum head portion 12 includes a first section 14 (which acts to distribute the steam and vacuum) and a second section 16 (which includes the steam nozzles and also scrapes the surface of the carcass) held together by bolts 18. A gasket 20 prevents the leakage of steam from between the mating surfaces of the first and second sections 14, 16.

Steam is provided to the wand by steam tube 22 and vacuum is connected to the wand from a vacuum source through vacuum tube 24. Steam temperature is monitored by temperature gauge 26 mounted in the first section 14.

The housing comprising handle portion 10 and vacuum head portion 12 is held at an appropriate angle and is drawn across the surface of the carcass over contaminants thereon. Steam supplied through steam tube 22 loosens the contaminants and vacuum connected through vacuum tube 24 draws the contaminants through the vacuum head then through the central opening in the handle portion 10 and out to the source of vacuum for disposal.

The handle is preferably made of a thermally insulating material such as a plastic to allow the tool to be handled comfortably during use. The insulation may also be separate.

In addition to loosening the contaminants, the steam acts to sanitize the carcass, to continuously wash and clean the portions of the tool closest to the carcass and to heat the first and second sections of the tool and maintain them above a desired sanitizing temperature. The heating caused by the flow of steam through the various steam passages in the first and second sections, and the positioning of the multiple steam nozzles relative to the portions of the tool that may contact the carcass or become contaminated are important factors in accomplishing these desired results.

Steam tube 22 and vacuum tube 24 are bound together with band 27. The steam tube 22 passes through elbow 28 and into the steam inlet port 30 in the first section 14 of the vacuum head 12. The first section is preferably machined of aluminum and is thermally conductive.

Figure 4:
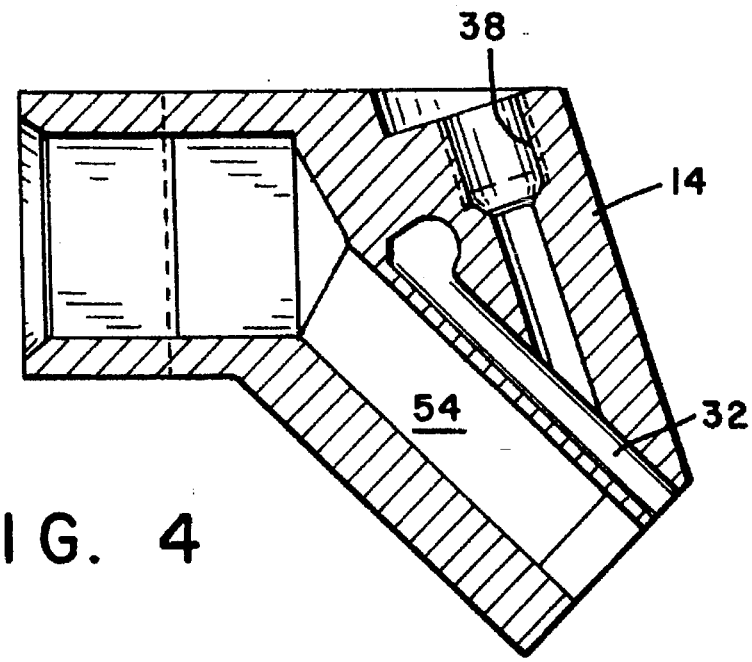
FIG. 4 is a cross sectional view of the first section of the vacuum head portion of the housing taken along the line 4—4 in FIG. 2.
Figure 5:
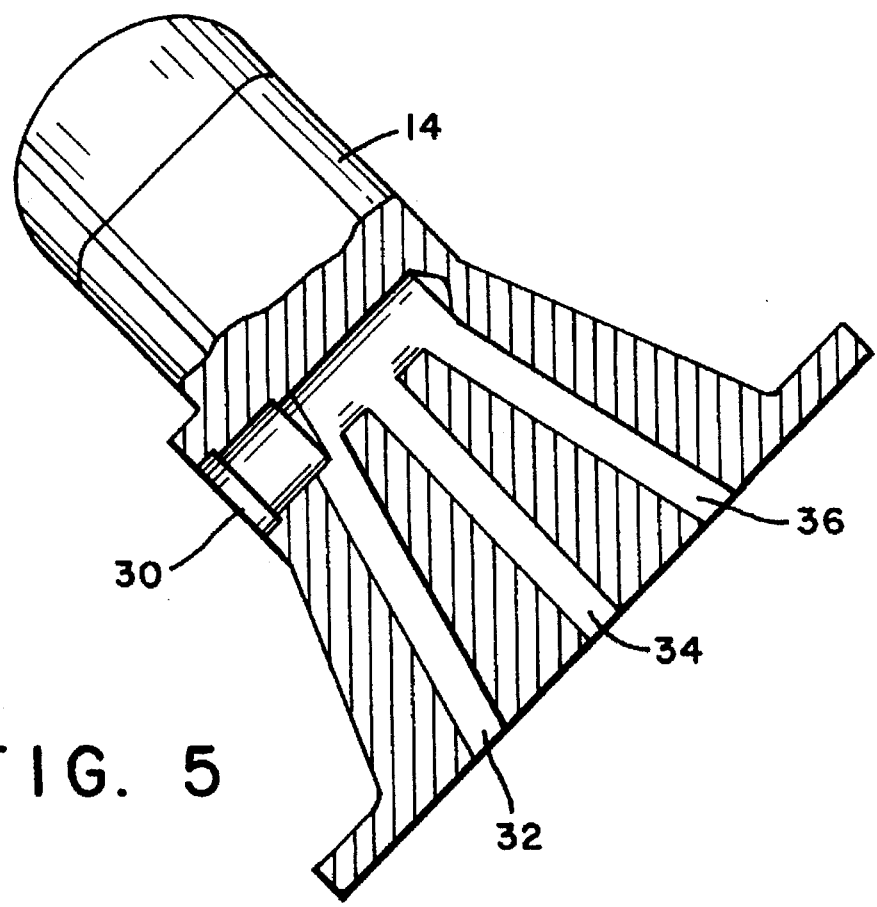
FIG. 5 is a cross sectional view of the first section of the vacuum head portion of the housing taken along the line of 5—5 in FIG. 3.
Figure 6:
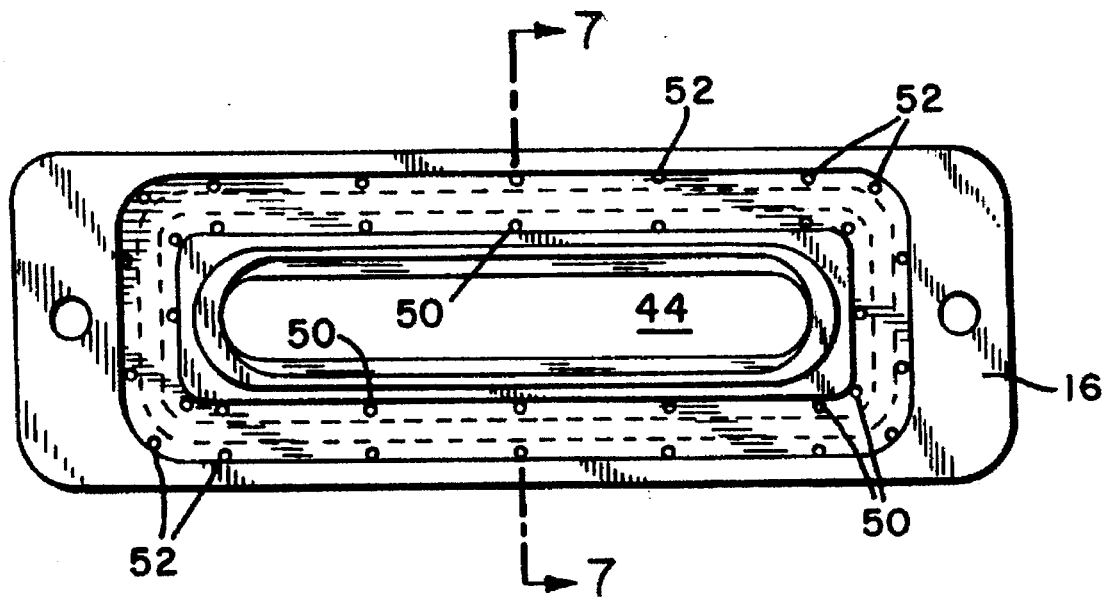
FIG. 6 is a rear view of the second section of the vacuum head portion of the housing as seen from the direction 6—6 in FIG. 1.
Figure 7:
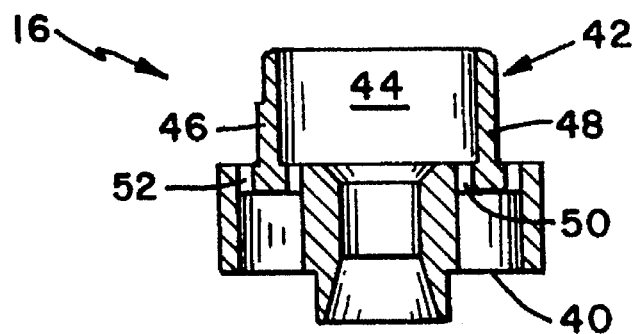
FIG. 7 is a cross sectional view of the second section of the vacuum head portion taken along the line 7—7 in FIG. 6.

Referring to FIGS. 4 and 5, it can be seen that the steam passage within the vacuum head portion includes three steam feeder passages, 32, 34 and 36 which fan out from the steam inlet 30. As can be seen in FIG. 4, the thermometer 26 is threaded into an opening 38 which connects to the steam feeder passage portions of the steam passageway so that the temperature of the vacuum head portion can be monitored. The multiple steam feeder passages 32, 34 and 36 coupled with the steam flow in the vicinity of the temperature gauge 26 keeps the entire vacuum head at or above the sanitizing temperature. Contaminants that are inadvertently picked up or deposited on the tool, and are not cleaned off, by the steam flow are sanitized by the continuous heating action of this design.

The steam flows out of the steam feeder passages 32, 34 and 36, through corresponding holes in the gasket 20 and into a ring shaped steam chamber 40 formed in the second section 16 of the vacuum head portion. The steam chamber 40 is at the bottom of the second section in the orientation illustrated in FIG. 7. It is formed between the first and second sections and underlies wall 42 where it acts to continuously heat the wall.

The wall 42 surrounds and defines a vacuum region 44 for the tool to which the vacuum source is connected through the handle and the vacuum passage. The wall 42 is generally rectangular in shape, with a section 46 of the wall having a lower height than the remaining higher sections 48 of the wall.

The second section 16 and the wall 42 thereon are preferably made of stainless steel and are thermally conductive. The stainless steel is extremely wear resistant, however other materials are also suitable. The close proximity of the wall to the steam chamber continuously maintains the wall at or above the desired sanitizing temperature. This close proximity also allows the steam to be maintained at a high temperature until it is very close to the surface of the carcass, separated only by the height of the wall.

Thus, when it is vented through nozzles, the steam needs to travel only a very short distance. This design arrangement with a large number of steam nozzles positioned very close to the carcass surface allows steam to be used inside the vacuum region, where reverse air flow is found. Because the steam need not travel very far, it does not cool significantly and heated water or water/steam is not needed. In the preferred embodiment of this invention the steam nozzles are placed less than 5 centimeters from the surface of the carcass and most preferably less than 2 centimeters from the surface of the carcass.

The two-piece construction of the vacuum head which is separated into a first 14 and second section 16, provides certain important advantages. The first section can be produced of a relatively light material, such as aluminum, to reduce weight and tool cost. The second section can be produced of a wear resistant material, such as stainless steel, which also makes an excellent material for the multiple nozzles that are vertically drilled into the underlying steam chamber.

The cleanliness of the tool is maintained in part by the continued washing action of the multiple nozzles on the wall, and in part by the constant sanitizing temperature of the tool surface. However, this high temperature can cause residue from the carcass, such as fats and other organics to "cook" on the surface of the tool. Accordingly, another advantageous feature is that the first or second section of the tool may be coated with a non-stick high temperature surface coating. Such coatings include tetrafluoroethylene fluorocarbon polymers and fluorinated ethylene-propylene resins, and other types of non stick cooking surfaces.

Any area of the tool that may be contaminated is advantageously coated for easy cleaning. However, the areas of the tool that actually contact the carcass receive a further advantage in that the friction between the tool and the carcass is reduced.

In use, the wand is drawn across the surface of the carcass and held at an angle which allows the wall section 46 to pass just over the contaminant. The lip of the wall along the other three wall sections is in contact with the carcass. As the wall section 46 passes over the contaminant, vacuum induced air flow lifts the contaminant from the surface of the carcass. Any material not lifted is mechanically scraped away by the lip and the inner surface of wall 48.

The lowered height of the wall 46 also acts to prevent the vacuum region 44 from vacuum locking to the surface of the carcass, while increasing the speed of the air flow and suction as needed to remove the contaminants from the carcass surface.

The vacuum lifting and scraping action is assisted by the flow of steam out of the steam chamber 40 through a plurality of steam nozzles located just inside and just outside the perimeter of the wall 42.

Inner steam nozzles 50 are located immediately adjacent to the wall 42 just inside the inner surface of the wall. Corresponding outer steam nozzles 52 are located just at the outside edge of the outer surface of the wall 42. The ring shaped steam chamber 40 has a width that is wider than the wall 42 and the steam nozzles are vertically drilled into the steam chamber 40 to form the nozzles. The location of the steam chamber 40 immediately below the wall 42 and in thermal contact therewith acts to maintain the entire wall at or above the sanitizing temperature.

The multiple inner and outer steam nozzles provide several distinct functions. A first function is to spray the carcass surface to loosen contaminants for removal. A second function is to raise the carcass surface temperature to produce a clean and sanitized carcass surface. A third function is to continuously spray and wash down the wall 42 on both the inner and outer surfaces to maintain the cleanliness of the wall. A last function is to assist in maintaining the temperature of the wall above the selected sanitizing temperature which may be between 180° F. to 240° F. (82° C.–115° C.).

In the preferred design, there are at least two steam nozzles on the inside and outside edge of the long walls and at least one steam nozzle on the inside and outside edge of each of the side walls. However, in the most highly preferred embodiment there are at least three inner and three outer nozzles on each of the long walls and at least one steam nozzle on the inner and outer edges of the short side walls, with one steam nozzle being located at each inner and outer corner of the rectangular wall.

The corner and side wall areas are locations that are difficult to keep clean and which other designs have not kept continuously sanitized. Locating a nozzle at each of the inside corners and at each of the outside corners significantly reduces the collection of unsanitary contaminants in these areas. Locating nozzles on the side walls has not previously been done, due partly to the expense of the separate nozzles used on previous designs. The integrated nozzles in the second section 16 of the present design are relatively inexpensive to produce.

The wall 42 surrounds and defines the vacuum region 44 which connects to vacuum passage 54. The vacuum passage extends through the first section 14 of the vacuum head and through the handle 10 to the end of the handle forming a vacuum port 56. The vacuum port extends through a mounting bracket 58 which supports the housing and steam tube 22. The components marked with reference numeral 60 shown in FIG. 1 connect the vacuum port 56 to the vacuum tube 24 which is in turn connected to the vacuum source.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A vacuum steam wand for sanitizing a carcass comprising:
   a housing including:
      a handle portion; and
      a vacuum head portion having a wall defining a vacuum region, the wall having an inner wall surface, an outer wall surface and a lip for contacting the carcass during vacuum steam sanitizing;
   a vacuum passage within the housing connected to the vacuum region and to a vacuum port adapted for connection to a source of vacuum;
   a steam passage within the housing, capable of maintaining and supplying steam at or above a desired sanitizing temperature, the steam passage being connected to a plurality of inner steam nozzles, a plurality of outer steam nozzles and to a steam inlet port adapted for connection to a source of steam, at least a portion of the steam passage being located adjacent to and in thermal contact with the wall;
   the plurality of inner steam nozzles being located within the vacuum region adjacent to the inner wall surface;
   the plurality of outer steam nozzles being located outside the vacuum region adjacent to the outer wall surface; and
   at least some of the inner and outer steam nozzles providing a steam spray partially directed towards the carcass and partially directed towards the wall, the number and location of the inner and outer steam nozzles being sufficient, in combination with the steam passage in thermal contact with the wall, to maintain the wall at or above the desired sanitizing temperature when the wand is in use.

2. A vacuum steam wand for sanitizing a carcass according to claim 1 further including a temperature gauge attached to the housing.

3. A vacuum steam wand for sanitizing a carcass according to claim 2 wherein the temperature gauge extends into the steam passage for monitoring the temperature of steam in the steam passage.

4. A vacuum steam wand for sanitizing a carcass according to claim 1 wherein the wall extends continuously around a perimeter of the vacuum region.

5. A vacuum steam wand for sanitizing a carcass comprising:
   a housing including:
      a handle portion; and
      a vacuum head portion having a wall defining a vacuum region, the wall having an inner wall surface, an outer wall surface and a lip for contacting the carcass during vacuum steam sanitizing, a section of the wall having a lower height than remaining sections of the wall, said lower height acting to allow contaminants on the carcass to pass into the vacuum region without accumulating on the outer wall surface as the wand is drawn over the carcass during use, and said remaining sections of the wall acting to scrape contaminants from the carcass with the inner wall surface where they may be dislodged by steam and drawn away by vacuum;
   a vacuum passage within the housing connected to the vacuum region and to a vacuum port adapted for connection to a source of vacuum;
   a steam passage within the housing, capable of maintaining and supplying steam at or above a desired sanitizing temperature, the steam passage being connected to a plurality of inner steam nozzles, a plurality of outer steam nozzles and to a steam inlet port adapted for connection to a source of steam, at least a portion of the steam passage being located adjacent to and in thermal contact with the wall;
   the plurality of inner steam nozzles being located within the vacuum region adjacent to the inner wall surface;
   the plurality of outer steam nozzles being located adjacent to the outer wall surface; and
   the number and location of the inner and outer steam nozzles being sufficient, in combination with the steam passage in thermal contact with the wall, to maintain the wall at or above the desired sanitizing temperature when the wand is in use.

6. A vacuum steam wand for sanitizing a carcass according to claim 1 wherein the steam passage includes a portion extending continuously beneath the wall to form a ring-shaped steam chamber.

7. A vacuum steam wand for sanitizing a carcass comprising:
   a housing including:
      a handle portion; and
      a vacuum head portion having a wall defining a vacuum region, the wall having an inner wall surface, an outer wall surface and a lip for contacting the carcass during vacuum steam sanitizing;
   a vacuum passage within the housing connected to the vacuum region and to a vacuum port adapted for connection to a source of vacuum;
   a steam passage within the housing, capable of maintaining and supplying steam at or above a desired sanitizing temperature, the steam passage being connected to a plurality of inner steam nozzles, a plurality of outer steam nozzles and to a steam inlet port adapted for connection to a source of steam, at least a portion of the steam passage being located adjacent to and in thermal contact with the wall, the steam passage extending beneath the wall and having a width that is greater than a width of the wall above the steam passage;
   the plurality of inner steam nozzles being located within the vacuum region adjacent to the inner wall surface;
   the plurality of outer steam nozzles being located adjacent to the outer wall surface; and
   the number and location of the inner and outer steam nozzles being sufficient, in combination with the steam passage in thermal contact with the wall, to maintain the wall at or above the desired sanitizing temperature when the wand is in use.

8. A vacuum steam wand for sanitizing a carcass according to claim 7 wherein the width of the steam passage is sufficiently great to extend below the plurality of outer steam nozzles and the plurality of outer steam nozzles extend downward for connection to the steam passage.

9. A vacuum steam wand for sanitizing a carcass according to claim 8 wherein the plurality of outer steam nozzles comprise a plurality of vertically drilled holes extending into the steam passage.

10. A vacuum steam wand for sanitizing a carcass according to claim 7 wherein the width of the steam passage is sufficiently great to extend below the plurality of inner steam nozzles and the plurality of inner steam nozzles extend downward for connection to the steam passage.

11. A vacuum steam wand for sanitizing a carcass according to claim 10 wherein the plurality of inner steam nozzles comprise a plurality of vertically drilled holes extending into the steam passage.

12. A vacuum steam wand for sanitizing a carcass according to claim 1 wherein the vacuum head portion of the housing includes first and second sections, the first section having the steam inlet port formed therein, and the second section having the wall formed thereon.

13. A vacuum steam wand for sanitizing a carcass according to claim 12 wherein the first section is thermally conductive and includes a plurality of steam feeder passages forming a first portion of the steam passage to maintain the first section at or above the desired sanitizing temperature when the wand is in use.

14. A vacuum steam wand for sanitizing a carcass according to claim 13 wherein the second section is thermally conductive and includes a ring shaped steam chamber forming a second portion of the steam passage.

15. A vacuum steam wand for sanitizing a carcass according to claim 14 the ring shaped steam chamber being connected to the feeder passages at points along the ring shaped steam chamber.

16. A vacuum steam wand for sanitizing a carcass according to claim 1 wherein the handle is thermally insulated.

17. A vacuum steam wand for sanitizing a carcass according to claim 1 wherein at least some part of the vacuum head is coated with a non stick coating.

18. A vacuum steam wand for sanitizing a carcass comprising:
a housing including:
a thermally insulated handle portion; and
a thermally conductive vacuum head portion having a wall defining a vacuum region, the wall having an inner wall surface, an outer wall surface and a lip for contacting the carcass during vacuum steam sanitizing;
a vacuum passage within the housing connected to the vacuum region and to a vacuum port adapted for connection to a source of vacuum;
at least one feeder passage within the housing and in thermal contact therewith, the feeder passage being connected to a steam inlet port adapted for connection to a source of steam;
a steam chamber connected to the at least one feeder passage and located within the housing in thermal contact therewith, the steam chamber and the at least one feeder passage cooperating to maintain the thermally conductive housing at or above a desired sanitizing temperature when the wand is in use, the steam chamber being connected to a plurality of inner steam nozzles and a plurality of outer steam nozzles, the inner and outer steam nozzles providing a steam spray partially directed towards the carcass and partially directed towards the wall;
a temperature gauge mounted to the housing for monitoring steam temperature;
the plurality of inner steam nozzles being located within the vacuum region adjacent to the inner wall surface; and
the plurality of outer steam nozzles being located adjacent to the outer wall surface.

19. A vacuum steam wand for sanitizing a carcass according to claim 18 wherein the steam chamber is ring shaped and is located beneath the wall, the plurality of inner and outer steam nozzles comprising holes drilled through the housing adjacent the inner and outer wall surfaces and into the steam chamber.

20. A vacuum steam wand for sanitizing a carcass according to claim 19 wherein the vacuum head portion of the housing includes first and second sections, the first section having the steam inlet port formed therein, and the second section having the wall formed on a first side thereof and the ring shaped steam chamber on a second side thereof.

21. A vacuum steam wand for sanitizing a carcass comprising:
a housing including:
a thermally insulated handle portion; and
a thermally conductive vacuum head portion having a wall defining a vacuum region, the wall having an inner wall surface, an outer wall surface and a lip for contacting the carcass during vacuum steam sanitizing a section of the wall having a lower height than remaining sections of the wall, said lower height acting to allow contaminants on the carcass to pass into the vacuum region without accumulating on the outer wall surface as the wand is drawn over he carcass during use, and said remaining sections of the wall acting to scrape contaminants from the carcass with the inner wall surface where they may be dislodged by steam and drawn away by vacuum;
a vacuum passage within the housing connected to the vacuum region and to a vacuum port adapted for connection to a source of vacuum;
at least one feeder passage within the housing and in thermal contact therewith, the feeder passage being connected to a steam inlet port adapted for connection to a source of steam;
a ring-shaped steam chamber connected to the at least one feeder passage and located beneath the wall within the housing in thermal contact therewith, the steam chamber and the at least one feeder passage cooperating to maintain the thermally conductive housing at or above a desired sanitizing temperature when the wand is in use, the steam chamber being connected to a plurality of inner steam nozzles and a plurality of outer steam nozzles;
a temperature gauge mounted to the housing for monitoring steam temperature;
the plurality of inner steam nozzles being located within the vacuum region adjacent to the inner wall surface;
the plurality of outer steam nozzles being located adjacent to the outer wall surface; and
the plurality of inner and outer steam nozzles comprising holes drilled through the housing adjacent the inner and outer wall surfaces and into the steam chamber.

22. A vacuum steam wand for sanitizing a carcass according to claim 18 wherein at least some part of the vacuum head is coated with a non stick coating.

23. A vacuum steam wand for sanitizing a carcass comprising:
a housing including;
a handle portion; and
a thermally conductive vacuum head portion having a wall formed thereon for scraping, the head portion being coated at least partially with a nonstick coating;

a vacuum passage within the housing; and at least one steam passage within the vacuum head portion and in thermal contact therewith, the steam passage being connected to a plurality of inner steam nozzles and a plurality of outer steam nozzles, the inner and outer steam nozzles providing a steam spray partially directed towards the carcass and partially directed towards the wall.

24. A vacuum steam wand for sanitizing a carcass comprising:

a handle;

a vacuum head attached to the handle and having a wall formed thereon, the wall having a higher section and a lower section connected by side wall sections defining a vacuum region therebetween, the higher section of the wall having a lip adapted for scraping contaminants from the surface of the carcass into the vacuum region during vacuum steam sanitizing;

a vacuum passage connected to the vacuum region and to a vacuum port adapted for connection to a source of vacuum;

a steam chamber formed within the vacuum head in thermal contact with the wall, the steam chamber being connected to a steam inlet port to provide steam at or above a desired sanitizing temperature; and a plurality of steam nozzles positioned in spaced relation around the wall, the steam nozzles being formed in the vacuum head and directly connecting into the steam chamber formed in the vacuum head, with at least one of the steam nozzles being located adjacent to one of the side wall sections, at least one of the steam nozzles being located adjacent to the other of the side wall sections, at least one of the steam nozzles being located adjacent to the higher wall section and at least one of the steam nozzles being located adjacent to the lower wall section.

25. A vacuum steam wand for sanitizing a carcass according to claim 24 wherein the steam chamber extends continuously beneath the wall to form a ring-shaped steam chamber.

26. A vacuum steam wand for sanitizing a carcass according to claim 24 wherein the steam nozzles comprise vertically drilled holes extending into the steam chamber.

27. A vacuum steam wand for sanitizing a carcass according to claim 24 wherein the vacuum head includes separable first and second sections connected together, the wall being formed on one side of the second section and the steam chamber being formed on an other side of the second section, the steam chamber being connected to the steam inlet port when the second section is connected to the first section of the vacuum head.

28. A vacuum steam wand for sanitizing a carcass according to claim 24 wherein the vacuum head includes first and second sections, the second section has the wall formed thereon, and the steam chamber is located approximately between the first and second sections.

29. A vacuum steam wand for sanitizing a carcass according to claim 28 wherein the first section of the vacuum head is thermally conductive and includes a plurality of steam feeder passages connected to the steam chamber, the steam feeder passages acting to maintain the first section of the vacuum head at or above the desired sanitizing temperature when the wand is in use.

30. A vacuum steam wand for sanitizing a carcass according to claim 24 wherein a portion of the vacuum head is coated with a non stick coating.

31. A vacuum steam wand for sanitizing a carcass according to claim 24 wherein the plurality of steam nozzles includes at least six steam nozzles, and wherein at least two of the six steam nozzles are located adjacent to the higher wall section and at least two of the six steam nozzles are located adjacent to the lower wall section.

32. A vacuum steam wand for sanitizing a carcass according to claim 31 wherein at least one of the steam nozzles is located adjacent to an outer surface of the higher wall section, at least one of the steam nozzles is located adjacent to an inner surface of the higher wall section, at least one of the steam nozzles is located adjacent to an outer surface of the lower wall section and at least one of the steam nozzles is located adjacent to an inner surface of the lower wall section.

33. A vacuum steam wand for sanitizing a carcass according to claim 24 wherein the plurality of steam nozzles includes at least ten steam nozzles, with at least two of the steam nozzles being located adjacent to one of the side wall sections, at least two of the steam nozzles being located adjacent to the other of the side wall sections, at least three of the steam nozzles being located adjacent to the higher wall section and at least three of the steam nozzles being located adjacent to the lower wall section.

34. A vacuum steam wand for sanitizing a carcass according to claim 24 wherein the wall has corners between the higher, lower and side wall sections, and the plurality of steam nozzles includes at least one steam nozzle positioned at each of the corners.

35. A vacuum steam wand for sanitizing a carcass according to claim 34 wherein the wall corners are rounded between the higher, lower and side wall sections.

36. A vacuum steam wand for sanitizing a carcass according to claim 24 wherein the wall has corners between the higher, lower and side wall sections, and the plurality of steam nozzles includes at least one steam nozzle positioned at an inside point relative to each of the corners and at least one steam nozzle positioned at an outside point relative to each of the corners.

37. A vacuum steam wand for sanitizing a carcass according to claim 24 wherein the side wall sections have the same height as the higher wall section and the lip adapted for scraping is smooth and extends from the higher wall section at a uniform height around and on the side wall sections to points at opposite ends of the lower wall section.

38. A vacuum steam wand for sanitizing a carcass according to claim 24 wherein the plurality of steam nozzles includes at least four steam nozzles located adjacent to an exterior surface of the higher wall section, at least four steam nozzles located adjacent to an exterior surface of the lower wall section and at least two steam nozzles located adjacent to an exterior surface of each of the side wall sections.

39. A vacuum steam wand for sanitizing a carcass according to claim 24 wherein the plurality of steam nozzles includes at least four steam nozzles located adjacent to an exterior surface of the higher wall section, at least four steam nozzles located adjacent to an interior surface of the higher wall section, at least four steam nozzles located adjacent to an exterior surface of the lower wall section, at least four steam nozzles located adjacent to an interior surface of the lower wall section, at least two steam nozzles located adjacent to an exterior surface of each of the side wall sections and at least two steam nozzles located adjacent to an interior surface of each of the side wall sections.

40. A vacuum steam wand for sanitizing a carcass comprising: a handle;

a vacuum head comprising:

a first section connected to the handle, the first section having a mounting surface formed thereon, and a removable second section having first and second sides, a wall defining a vacuum region being formed on the first side of the second section and a channel forming a steam chamber on the second side of the second section, the second side being mounted to the mounting surface of the first section, and the wall having a lip adapted for scraping contaminants from the surface of the carcass into the vacuum region during vacuum steam sanitizing;

a vacuum passage connected to the vacuum region and to a vacuum port adapted for connection to a source of vacuum;

the steam chamber being connected to a steam passage adapted for connection to a source of pure steam, to provide steam at or above a desired sanitizing temperature; and a plurality of steam nozzles positioned in spaced relation around the wall, the steam nozzles extending from the first side of the second section into the steam chamber on the second side of the second section.

41. A vacuum steam wand for sanitizing a carcass according to claim 40 wherein the steam chamber is ring shaped and is located beneath the wall.

42. A vacuum steam wand for sanitizing a carcass according to claim 40 wherein the wall includes first and second side wall sections and the plurality of steam nozzles includes at least one steam nozzle located adjacent to the first side wall section and at least one steam nozzle located adjacent to the second side wall section.

43. A vacuum steam wand for sanitizing a carcass according to claim 40 wherein at least some portion of the second section of the vacuum head is coated with a non stick coating.

44. A vacuum steam wand for sanitizing a carcass according to claim 40 wherein a section of the wall has a lower height than remaining sections of the wall, said lower height acting to allow contaminants on the carcass to pass into the vacuum region without accumulating on an outer surface of the wall as the wand is drawn over the carcass during use, and said remaining sections of the wall acting to scrape contaminants from the carcass where they may be dislodged by steam and drawn away by vacuum.

45. A vacuum steam wand for sanitizing a carcass according to claim 44 wherein the lower wall section and the higher wall section are connected by side wall sections.

46. A vacuum steam wand for sanitizing a carcass according to claim 45 wherein the wall has corners between the higher, lower and side wall sections, and the plurality of steam nozzles includes at least one steam nozzle positioned at each of the corners.

47. A vacuum steam wand for sanitizing a carcass according to claim 45 wherein the plurality of steam nozzles includes at least ten steam nozzles, with at least two of the steam nozzles being located adjacent to one of the side wall sections, at least two of the steam nozzles being located adjacent to the other of the side wall sections, at least three of the steam nozzles being located adjacent to the higher wall section and at least three of the steam nozzles being located adjacent to the lower wall section.

48. A vacuum steam wand for sanitizing a carcass according to claim 47 wherein the wall corners are rounded between the higher, lower and side wall sections.

49. A vacuum steam wand for sanitizing a carcass according to claim 45 wherein the wall has corners between the higher, lower and side wall sections, and the plurality of steam nozzles includes at least one steam nozzle positioned at an inside point relative to each of the corners and at least one steam nozzle positioned at an outside point relative to each of the corners.

50. A vacuum steam wand for sanitizing a carcass according to claim 45 wherein the side wall sections have the same height as the higher wall section and the lip adapted for scraping is smooth and extends from the higher wall section at a uniform height around and on the side wall sections to points at opposite ends of the lower wall section.

51. A vacuum steam wand for sanitizing a carcass comprising:

a handle;

a vacuum head comprising:

a first section connected to the handle, the first section having a mounting surface formed thereon, and a removable second section having first and second sides, a wall defining a vacuum region being formed on the first side of the second section and a channel defining a steam chamber being formed on the second side of the second section, the second side being mounted to the mounting surface of the first section, and the wall having a lip adapted for scraping contaminants from the surface of the carcass into the vacuum region during vacuum steam sanitizing;

a vacuum passage connected to the vacuum region and to a vacuum port adapted for connection to a source of vacuum;

the steam chamber being connected to a steam passage providing pure steam, without injected water, at or above a desired sanitizing temperature;

a first plurality of steam nozzles positioned in spaced relation around an outer surface of the wall; and a second plurality of steam nozzles positioned in spaced relation around an inner surface of the wall, the first and second plurality of steam nozzles extending from the first side of the second section proximate a base of the wall directly into the steam chamber.

* * * * *